United States Patent Office 2,981,703
Patented Apr. 25, 1961

2,981,703
PROCESS FOR PRODUCING AQUEOUS STOVING VARNISHES

Herbert Hoenel, Graz, Austria, assignor to Vianova Kunstharz Aktiengesellschaft, Vienna, Austria, a corporation of Austria No Drawing. Filed Oct. 24, 1956, Ser. No. 617,923
Claims priority, application Austria Nov. 22, 1955
9 Claims. (Cl. 260—20)

The present invention is aiming at the production of improved aqueous stoving varnishes from a mixture of heat hardening condensation products, such as resols or urea formaldehyde type resins (aminoplasts), and plasticizing resins carrying unsaturated groups, in which process the plasticizing component is subjected to an oxidizing treatment, either separately or in the presence of the hardening component.

It is known already from U.S. Patent No. 2,681,894 to produce compositions of matter serviceable as stoving varnishes, being water soluble at least in the presence of a subordinate proportion of organic water miscible solvent, which comprise the combination product of the following components: (I) a hydrophilic, hardenable, low molecular methylol compound selected from the group consisting of (a) phenol alcohols derived from phenols having only one phenolic OH per nucleus and a part thereof at least, being phenols selected from the group consisting of ortho- and para-substituted phenols having only two reactive positions and (b) reaction products of formaldehyde with a compound selected from the group consisting of urea and melamine, the hardening capacity of said reaction products being diminished by partial etherification of their methylol groups with a low molecular weight mono-hydric alcohol; (II) a plasticizing alkyd resin modified by a compound containing at least 6 carbon atoms, any cyclic structures present in said compound being alicyclic structures only, in the production of which resin a considerable excess of alcoholic OH groups over COOH groups is employed, said resin having an acid number of at least about 40 and having 1 gram hydroxyl group in 145 to 280 grams of said resin; and (III) a water soluble base selected from the group consisting of ammonia and strong organic nitrogen bases, said base forming a soap with component II, the said composition being substantially neutral. The compatibility between component I and II, which means the achievement of a clear stoved film, depends to a great extent from the presence of free, preferably primary, hydroxyl groups in the component II and in a given case also from the presence of C=C linkages, more particularly conjugated ones; these groups, more particularly the hydroxyl groups, must be the more numerous the more reactive and efficient the hardening component is. The hydroxyl groups, it is true, serve for securing the necessary hydrophilic character but their number must not be too high in view of their causing various deficiencies of the varnish, e.g. uneven flow, formation of craters and the like as well as reduced water resistance of the stoved film.

It has been found that already blowing with air of the plasticizing component at elevated temperatures, especially in the presence of an oxygen transferring catalyst, e.g. a siccative, may produce desirable effects to some extent. Much more efficient, however, is a treatment with substances splitting off oxygen, particularly peroxides. The treatment may be carried out at room temperature, possibly with the mixture of both components or with the finished varnish in the cold. The intended effect, however, mostly becomes apparent a few days later only. The treatment, however, is more suitably and effectively executed in a separate process at elevated temperature with the plasticizing component alone prior to its being mixed with the hardening component.

As has been further found, it is by no means necessary to use the relatively expensive organic peroxides such as benzoyl or di-tert. butyl peroxide since the relatively inexpensive hydrogen peroxide in the usual aqueous solution is suitable at least just as well. The treatment of the plasticizing component is suitably carried out at temperatures between 100 and 160° C. simultaneously removing the water present or formed, respectively, by distillation which may be supported by diminished pressure or the presence of an organic solvent forming an azeotropic mixture with the water, or by simultaneous application of both measures.

By the present oxidizing treatment e.g. the water solubility can considerably be improved. Furthermore the increased readiness of the plasticizing component to mutual reaction with the hardening component brought about with the aid of the claimed process, results in a series of advantages. It is possible without otherwise altering the composition to choose a more effective hardening component, so that its proportion may be reduced without diminishing the hardness of the stoved film. This possible reduction is also due to the fact that the plasticizing component itself, after the claimed treatment, exhibits a certain hardening character. The increased reaction capability of the plasticizing component, so far as resols are coemployed, furthermore offers the advantage that e.g. the completely water soluble resols of phenol, i.e. phenol alcohols, despite their superior selfhardening character, may be employed to a greater extent, a fact which is favourable to the dilutability of the whole mixture with water containing C=C linkages to a considerable extent. Logically with the aid of this process it is on the other hand also possible to reduce e.g. the high hydroxyl content of the plasticizing component, which is necessary according to my prior process mentioned above, to an appreciable extent e.g. corresponding to a hydroxyl equivalent number of about 400 or more without altering the hardening component or its character respectively.

Especially in cases of a more intensive treatment with peroxide, the increased reaction capability of the plasticizing component with the hardening one generally also becomes apparent by a considerably improved gloss of the stoved pigmented film. The treatment according to the present process is for this reason recommended also in such cases, where the mixture of the two components, without the claimed treatment, already gives a clear stoved film.

*Example 1*

(a) Each 80 g. linseed oil fatty acids and tall oil fatty acids, both distilled, acid number about 190, and 100 g. pentaerythritol, technical grade, with a content of about 15% of polypentaerythritol as a maximum, are heated to 180–230° C. under thorough stirring until the acid number of the reaction mixture has dropped to about 5. Thereupon 100 g. phthalic anhydride are added and the mixture is heated up to about 200° C. under continuous stirring until an alkyd resin with the acid number 62 is formed. A part of the same is dissolved in one third of its weight of Ethyl Cellosolve and kept for further experiments.

(b) 60 g. of the resin according to (a) are treated with 10 g. hydrogen peroxide (30%), the same being slowly added at a temperature of 150–160° C. while stirring, and thereupon the product is dissolved in 20 g. Ethyl Cellosolve.

(c) A phenol mono- and polyalcohol mixture is produced from 100 g. phenol and 150 g. formaldehyde (30%) with the aid of barium hydroxide at 35–40° C. After precipitation of the catalyst by means of carbon dioxide and filtration from the carbonate formed, the solution is concentrated in vacuum at 40° C. to a weight of 150 g. The product which is almost free of water is dilutable with water to an unlimited extent.

(d) The dialcohol is formed from 100 g. of p-tertbutyl phenol and 140 g. formaldehyde (30%) in a known manner, soda lye being used as catalyst which is finally neutralized and completely eliminated. The dialcohol is washed several times with water. The yield of the water retaining, however, well settled liquid product averages 150 g.

(e) 80 g. of the resin solution (60 g. solids) according to (a) are mixed with 30 g. of the phenol alcohols according to (c) and with 15 g. according to (d); an amount of ammonia necessary for permanent neutralization is added and the total weight brought with water to 220 g. The coating of the about 45% solution on a glass plate it is true, dries completely clear, however, after stoving at 170–180° C. gives a distinctly turbid film of poor mechanical resistance.

(e′) Only by increasing the amount of phenol alcohols according to (d) up to 24–30 g., after stoving a clear and very hard film is obtained. However, the good dilutability of the entire mixture with water is impaired by the considerable increase of the only poorly water soluble butyl phenol dialcohol, and a further addition of Ethyl Cellosolve may be necessary to homogenize the blend.

(f) The resin solution according to (b) is mixed with 30 g. phenol alcohol according to (c) and 15 g. phenol alcohol according to (d), and it is further processed as indicated above under (e). A completely clear stoved film of about the same hardness as that according to (e′) is obtained. When freshly prepared the mixture after neutralization with ammonia is dilutable with water to an unlimited extent and even permits a considerable reduction of the Ethyl Cellosolve.

Pigmented varnishes prepared from products obtained according to (e′) and (f), respectively, e.g. by grinding each with 30–40 g. titanium dioxide (rutile type), (which is suitably carried out when the main quantity of water is absent prior to the neutralization), show a considerable difference of the gloss in favour to that from the product according to (f).

Example 2

(a) The monoester is formed by heating together at 180–250° C. 213 g. (1 mol) distilled coconut oil fatty acids, fraction containing carbon chains of 10 to 12 C-atoms, acid number 263, and 140 g. pentaerythritol (about 1 mol), technical grade, melting point 240° C. Thereupon 116 g. fumaric acid are added and a polyester with an acid number of 63 is formed under exclusion of air at 180–220° C. Yield about 420 g.

(b) 10 g. hydrogen peroxide, 30%, are slowly added under stirring to 100 g. of the polyester according to (a) at a temperature of 140° C. and finally a current of air is conducted through in order to completely remove the water.

A 40% solution is prepared of both the above products with the aid of a small excess of ammonia over the calculated amount. Each 100 g. of these soaps are mixed with 18 g. of the condensation product according to Example 1(c) and 12 g. of that according to Example 1(d), forming 50% aqueous varnishes. While a coating of the varnish produced with the untreated polyester according to 2(a) becomes completely turbid after stoving (e.g. 180° C., 15 minutes), the other one remains completely clear. In order to achieve a clear stoved film from the polyester according to 2(a) the proportion of the two condensation products (3:2) must almost be reversed (2:3). Thereby the further dilutability of the still thickly viscous varnish, however, becomes very poor and it is necessary to replace a considerable part of the water by Ethyl Cellosolve.

Also when amines or amine alcohols are used instead of ammonia definitely superior properties of the polyester after treatment with peroxide are quite noticeable.

Example 3

(a) 60 g. paraformaldehyde are dissolved in 200 g. α,β-propylene glycol at 80° C. under addition of 1, 2 cc. 1 N solution of sodium hydroxide. Thereupon 42 g. melamine (⅓ mol) and 1 cc. 10 N solution of sodium hydroxide are added while stirring within 20 minutes at a temperature of 80° C. If the solution is not clear, the temperature should be raised up to 100° C. for a short period, and immediately upon dissolving of the melamine lowered again to 80° C. The reaction mixture is kept at that temperature for four hours. Thereupon 10–12 cc. of aqueous distillate are distilled off under diminished pressure at 60° C.

Then 0.3 g. oxalic acid, dissolved in propylene glycol, are added in one portion, which brings about a pH of about 5.5. After addition of about 30 g. benzene the reaction mixture is subjected to a circulation distillation (at 75–80° C.) under stirring, constantly reconducting the benzene but not the aqueous distillate carried over. Within four hours gradually further 0.2 g. oxalic acid are added in order to maintain the mentioned pH. During a total period of seven hours, calculated from the beginning of the circulation distillation, further 15–16 cc. aqueous distillate are formed.

By the addition of about 5 cc. 1 N solution of soda lye the reaction mixture is carefully neutralized and freed from the benzene under diminished pressure as well as from a part of the glycol used in excess, with the aid of vacuum at temperatures below 100° C. This distillation may be supported by a suitable indifferent solvent such as white spirit. The distillation is continued until the weight of the reaction mixture has dropped to 210 g. Thereupon it is brought to a weight of 280 g. by means of ethanol, and filtered. The solid content is about 140 g.

(b) Each 15 g. of the melamine resin solution according to (a) are mixed with each 100 g. 30% resin soap solutions, which are produced by means of trimethylamine from the alkyd resins according to Examples 1(a) and 1(b). If necessary, the mixtures may be further diluted.

Upon applying the varnishes and stoving at 130° C. (about 15–30 minutes) the first mixture gives a turbid, dull film whereas the latter gives a clear and glossy and, moreover, considerably harder film.

(c) 5 g. hydrogen peroxide (30%) are added to the aqueous varnish obtained by blending the trimethylamine soap solution of the alkyd prepared according to Example 1(a) and the melamine resin solution according to Example 3(a) (compare above under (b) of this example). After resting for several days the varnish yields a considerably improved stoved film.

This effect may be considerably accelerated by applying slightly elevated temperatures.

Similar distinctions may be observed when the alkyd used in this example is replaced by another oil modified alkyd which also has a corresponding excess of hydroxyl groups. When oils or their fatty acids having conjugated double bonds are used in the production of the alkyd, it should be taken into consideration that the increase of viscosity, when treated with peroxide, is considerably higher than in the presence of other drying or semi-drying oils.

For reasons of simplicity, only condensation products (resols) from phenol and butyl phenol respectively are mentioned in the foregoing examples. They are, so to say, classical representatives of a relatively highly and a relatively poorly reactive resol. Just as well, for instance, a mixed condensation product produced directly from a mixture of phenol and o-cresol or phenol and p-cresol may be employed instead of a mixture of separately formed resols from phenol and butyl phenol respectively.

The present process can also be varied in that the blend of the plasticizing and hardening components is subjected to a moderate heat treatment prior to being dissolved or being neutralized with ammonia or another nitrogen base for final use.

*Example 4*

(a) 150 g. gum rosin (acid number 175), 150 g. dehydrated castor oil, 100 g. linseed oil, and 100 g. maleic anhydride are heated while stirring for one hour at 160–170° C., and for two more hours to 200–220° C. Thereupon 250 g. diethylene glycol, 50 g. trimethylol ethane, and 150 g. phthalic anhydride are added to the mixture and heating is continued up to a temperature of about 250° C., and interrupted when an acid number of 55 is attained.

After cooling to 150° C., 40 to 45 g. of hydrogen peroxide (30%) are slowly added with constant stirring and maintaining the temperature, for which treatment (causing a considerable increase in viscosity) about two hours are necessary.

The batch (yield about 920 g.) is diluted with each 115 g. hexylene glycol (Shell) and sec. butanol.

(b) 125 g. of the solution (solid content 100 g.) are mixed with 90 g. of the butanolic solution of the dimethylol compound of diphenylol propane glycolic acid semiether (derived from 40 g. of said phenol), which is described in my copending application Serial Number 617,-922, filed October 24, 1956, concerning process for producing aqueous stoving varnishes.

After neutralization with ammonia, the mixture is dilutable wtih water to any desired extent and may serve, after appropriate dilution, as stoving varnish. Films of excellent hardness, elasticity and gloss are obtained, whilst a corresponding mixture using the same alkyd, however, without the peroxide treatment, leads to a stoved film (enamel) of poor gloss only.

Where the term "water-soluble" appears in the following claims, it is intended to mean that the product of the invention is soluble either in water alone or in water containing a minor proportion of an organic solvent compatible with water in such proportion.

What I claim is:

1. An improved process for producing a water-soluble resinous composition which comprises the steps of treating an ethylenically unsaturated, plasticized alkyd resin with an oxidizing agent selected from the group consisting of hydrogen peroxide and organic peroxides, said alkyd resin having an acid number of at least about 40 and a hydroxyl equivalent number of about 145–400, the number of hydroxyl groups being substantially greater than carboxyl groups; combining said treated alkyd resin with a hydrophilic, hardenable, low molecular weight methylol compound selected from the group consisting of (a) a reaction product of formaldehyde and a phenol, said phenol having only one phenolic hydroxyl group per aryl nucleus and at least a portion of the phenol being blocked in one position selected from the group consisting of ortho and para in relation to the phenolic hydroxyl group and (b) a reaction product of formaldehyde and a compound selected from the group consisting of urea and melamine, said reaction product (b) being partially etherified with a low molecular weight monohydric aliphatic alcohol; neutralizing the mixture with a water-soluble base selected from the group consisting of ammonia and strong organic nitrogen bases.

2. The method of claim 1 including the step of diluting the neutralized mixture with water to form a water solution thereof.

3. The method of claim 1 wherein said treatment with said oxidizing agent is carried out at a temperature of about 100–160° C.

4. The product made by the process of claim 1.

5. An improved process for producing a water-soluble resinous composition which comprises the steps of treating an ethylenically unsaturated, plasticized alkyd resin with an oxidizing agent selected from the group consisting of hydrogen peroxide and organic peroxides, said alkyd resin having an acid number of at least about 40 and a hydroxyl equivalent number of about 145–400, the number of hydroxyl groups being substantially greater than carboxyl groups; neutralizing the treated alkyd resin with a water-soluble base selected from the group consisting of ammonia and strong organic nitrogen bases; and combining said neutralized resin with a hydrophilic, hardenable, low molecular weight methylol compound selected from the group consisting of (a) a reaction product of formaldehyde and a phenol, said phenol having only one phenolic hydroxyl group per aryl nucleus and at least a portion of the phenol being blocked in one position selected from the group consisting of ortho and para in relation to the phenolic hydroxyl group and (b) a reaction product of formaldehyde and a compound selected from the group consisting of urea and melamine, said reaction product (b) being partially etherified with a low molecular weight monohydric aliphatic alcohol.

6. The method of claim 5 including the step of diluting the mixture with water.

7. The method of claim 5 wherein said treatment with said oxidizing agent is carried out at a temperature of about 100–160° C.

8. The product made by the process of claim 5.

9. As a composition of matter an improved aqueous stoving varnish comprising (I) an infinitely water-soluble mixture of (a) the condensation product of 20 parts of phenol and 30 parts of 30% formaldehyde and (b) the condensation product of 10 parts para tertiary butyl phenol and 14 parts of 30% formaldehyde, (II) a solution of 20 parts ethylene glycol monoethyl ether and the oxidation product of 60 parts of an alkyd resin and 10 parts of 30% hydrogen peroxide, the oxidation reaction carried out by heating at 150–160° C., said alkyd resin being the reaction product of (1) 80 parts of distilled linseed oil fatty acids, (2) 80 parts of tall oil fatty acids, (3) 100 parts of pentaerythritol which has a polypentaerythritol content of not more than 15% and (4) 100 parts of phthalic anhydride, wherein (1), (2) and (3) are heated to form a substantially neutral partial ester, whereupon (4) is added to said partial ester and heated with stirring until the acid number is reduced to 62, (III) sufficient ammonia to neutralize the mixture of I and II, and (IV) sufficient water to bring the weight of the composition to 220 parts.

References Cited in the file of this patent

UNITED STATES PATENTS

| | | |
|---|---|---|
| 2,074,782 | Edgar | Mar. 23, 1937 |
| 2,195,362 | Ellis | Mar. 26, 1940 |
| 2,374,381 | Root | Apr. 24, 1945 |
| 2,388,319 | Fuller | Nov. 6, 1945 |
| 2,416,282 | Biggs | Feb. 25, 1947 |
| 2,446,314 | Wagers et al. | Aug. 3, 1948 |
| 2,681,894 | Honel | June 22, 1954 |